United States Patent [19]
Maubray

[11] Patent Number: 5,168,596
[45] Date of Patent: Dec. 8, 1992

[54] WINDSCREEN WIPER AND DEFLECTOR THEREFOR

[75] Inventor: Daniel L. Maubray, Issy Les Moulineaux, France

[73] Assignee: Valeo Systemes D'Essuyage, Montigny-LeBretonne, France

[21] Appl. No.: 253,864

[22] Filed: Oct. 5, 1988

[30] Foreign Application Priority Data

Oct. 6, 1987 [FR] France .................................. 87 13770

[51] Int. Cl.⁵ .................................................. B60S 1/38
[52] U.S. Cl. .................................. 15/250.2; 15/250.36; 15/250.42
[58] Field of Search ............. 15/250.19, 250.2, 250.42, 15/250.36

[56] References Cited

U.S. PATENT DOCUMENTS

| | | | |
|---|---|---|---|
| 4,570,284 | 2/1986 | Verton | 15/250.42 |
| 4,590,638 | 5/1986 | Beneteau | 15/250.42 |
| 4,793,020 | 12/1988 | Stratton et al. | 15/250.42 |

FOREIGN PATENT DOCUMENTS

| | | | |
|---|---|---|---|
| 226013 | 6/1987 | European Pat. Off. | |
| 239201 | 9/1987 | European Pat. Off. | |
| 253696 | 1/1988 | European Pat. Off. | 15/250.19 |
| 2346100 | 4/1975 | Fed. Rep. of Germany | 15/250.42 |
| 3139444 | 4/1983 | Fed. Rep. of Germany | 15/250.42 |
| 3309972 | 9/1984 | Fed. Rep. of Germany | 15/250.42 |
| 3637348 | 5/1988 | Fed. Rep. of Germany | 15/250.2 |
| 2216795 | 8/1974 | France | |
| 2550744 | 2/1985 | France | |
| 2556297 | 6/1985 | France | |
| 2594083 | 8/1987 | France | 15/250.42 |
| 2594765 | 8/1987 | France | 15/250.42 |
| 2030447 | 4/1980 | United Kingdom | 15/250.42 |
| 2106775 | 4/1983 | United Kingdom | 15/250.42 |
| 2144977 | 3/1985 | United Kingdom | 15/250.42 |
| 2146891 | 5/1985 | United Kingdom | |

*Primary Examiner*—Harvey C. Hornsby
*Assistant Examiner*—Mark Spisich
*Attorney, Agent, or Firm*—Wenderoth, Lind & Ponack

[57] ABSTRACT

An anti-lift deflector for a windscreen wiper includes a hooking member for mounting the deflector onto a wiper or wiper arm and an aerodynamic blade attached to the hooking member and having a substantially flat first zone extending rearwardly from a leading edge of the blade followed by a second zone which is inclined relative to the first zone and which terminates at a trailing edge of the blade. During use of the deflector, the first zone is slightly inclined relative to the surface to be wiped and the second zone is inclined relative to the surface to be wiped at an angle greater than the first zone. This creates a surface effect giving a relatively large pressure decrease below the deflector, thus forcing the wiper blade into contact with the surface to be wiped.

20 Claims, 3 Drawing Sheets

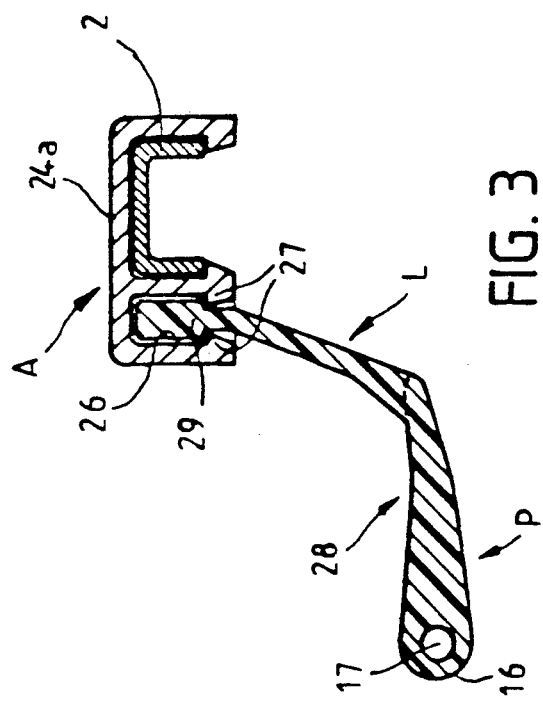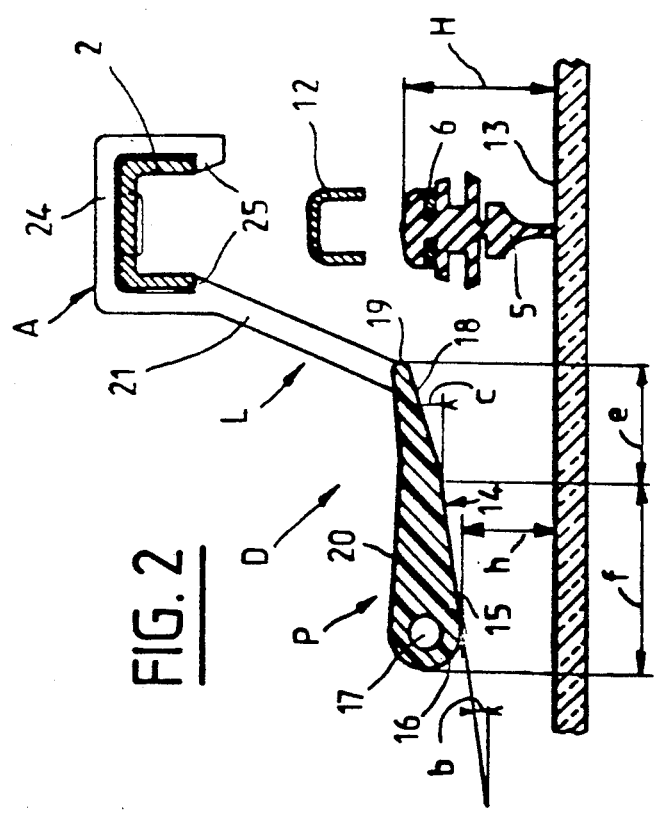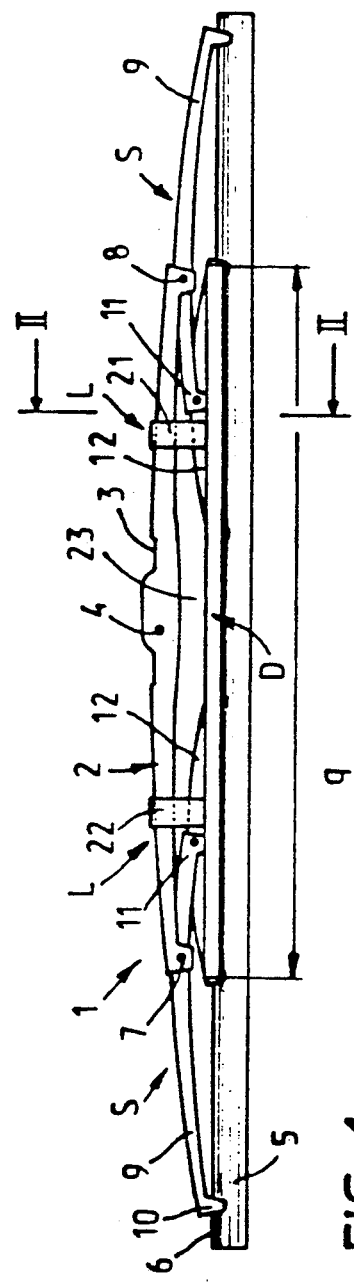

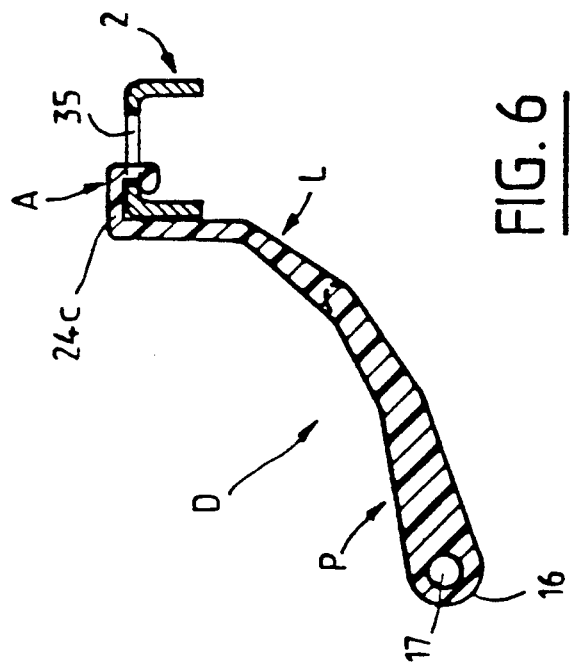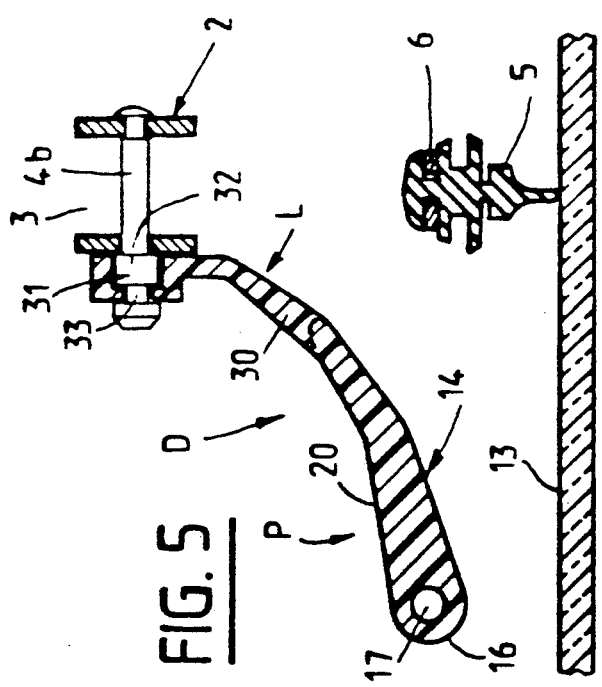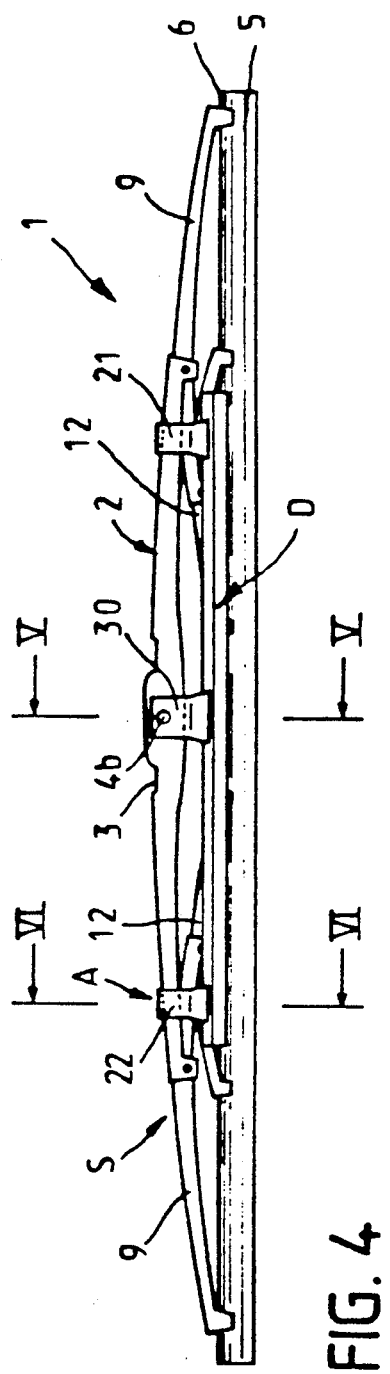

WINDSCREEN WIPER AND DEFLECTOR THEREFOR

FIELD OF THE INVENTION

The invention relates to a deflector for a windscreen wiper carried by a windscreen or windshield wiper arm.

It is known that the flow of air over the windscreen of a vehicle, in particular an automotive vehicle, has a tendency to cause lifting of the windscreen wipers and to separate the wipers from the surface to be wiped, in spite of the elastic return means normally provided to urge the wipers against provision of the surface. This phenomenon is greater the higher the speed of the vehicle.

BACKGROUND OF THE INVENTION

It has been proposed to mount air deflectors on the wipers or on the windscreen wiper arms in such a way as to create an aerodynamic effect which acts to apply the wiper against the surface, e.g. glass, to be wiped. Numerous solutions have been proposed with the general aim of creating an over-pressure above the deflector in order to apply the arm and the wiper against the glass surface.

French Patent Application No. 1 173 747 envisages not only causing an over-pressure above the wiper, but also a reduced pressure below the wiper. However, this document does not really relate to a deflector made separately from the wiper and able to be mounted subsequently on the wiper, but rather to a wiper in which the supporting bar or the blade holder has a special profile in order to provide the necessary down-force. This solution cannot be applied to an existing wiper.

A main object of the invention is to provide an inexpensive and simple air deflector which is adapted to be mounted on an existing wiper.

SUMMARY OF THE INVENTION

According to the invention, a deflector for a windscreen wiper carried by a windscreen wiper arm comprises hooking means for hooking the deflector onto the wiper or the arm, and a shaped part with a generally convex shape turned away from the hooking means. The shaped part includes a substantially flat first zone extending from a front edge towards the rear, and slightly inclined relative to the median plane of the surface to be wiped, and a second zone extending from the first zone and terminating at a rear edge and with a slope relative to the surface to be wiped greater than the slope of the first zone.

Advantageously the first zone is inclined at an angle between 4° and 20° and preferably about 8° relative to the surface to be wiped, whereas the second zone is inclined at about 25°.

Such an arrangement provides a deflector having a shaped part which comprises a large portion close to the surface to be wiped, the effect of which is to create a surface effect producing a relatively large reduction in pressure below the deflector in order to force the windscreen wiper against the glass surface.

In order to obtain greater efficiency, the hooking means are given a length such that the zone of the shaped part closest to the surface to be wiped is at a small distance (h) from such surface, the distance (h) preferably being smaller than the height (H) of the blade which the windscreen wiper carries.

The hooking means, the shaped part and connecting means may therebetween be a single piece obtained by molding. The connecting means may be formed by connecting legs separated from one another by a space.

The hooking means may comprise clips suitable for clipping, in particular, onto a the supporting bar of the windscreen wiper.

The hooking means, in particular the clips, may be provided with a housing located on the outside of the wiper relative to the supporting bar, whereas the shaped part and the connecting means may form a single piece separate from the hooking means, the connecting means comprising at their end furthest away from the shaped part an element having a section complementary to that of the housing of the hooking means, such element being adapted to be engaged and fixed, particularly by clipping, into the housing to provide an assembly of the hooking means and the connecting means. In this embodiment, the single piece formed by the shaped part and the connecting means may be obtained by extrusion.

Alternatively, the deflector may be made in several sections connected to different extension bars of the windscreen wiper, thus enabling the shape of the surface to be wiped, generally the windscreen, to be followed more precisely.

The front edge of the deflector may have therein a longitudinal internal channel opening in the direction of the surface to be wiped through nozzles, such channel being adapted to be connected to a pipe supplying a washing liquid for washing the surface to be wiped. Such a deflector is preferably made of plastics material.

The invention also is directed to a windscreen wiper equipped with a deflector of the kind described above.

BRIEF DESCRIPTION OF THE DRAWINGS

FIG. 1 is a view in lateral elevation of a windscreen wiper equipped with an air deflector according to the invention;

FIG. 2 is a section along the line II—II in FIG. 1, drawn to a larger scale and showing a part of a surface to be wiped;

FIG. 3 is a view similar to FIG. 2 of an alternative embodiment of deflector;

FIG. 4 is a view in lateral elevation of a windscreen wiper equipped with another embodiment of deflector;

FIG. 5 is a section along the line V—V in FIG. 4, drawn to a larger scale;

FIG. 6 is a section along the line VI—VI in FIG. 4, drawn to a larger scale;

DESCRIPTION OF THE PREFERRED EMBODIMENTS

Figure 8:
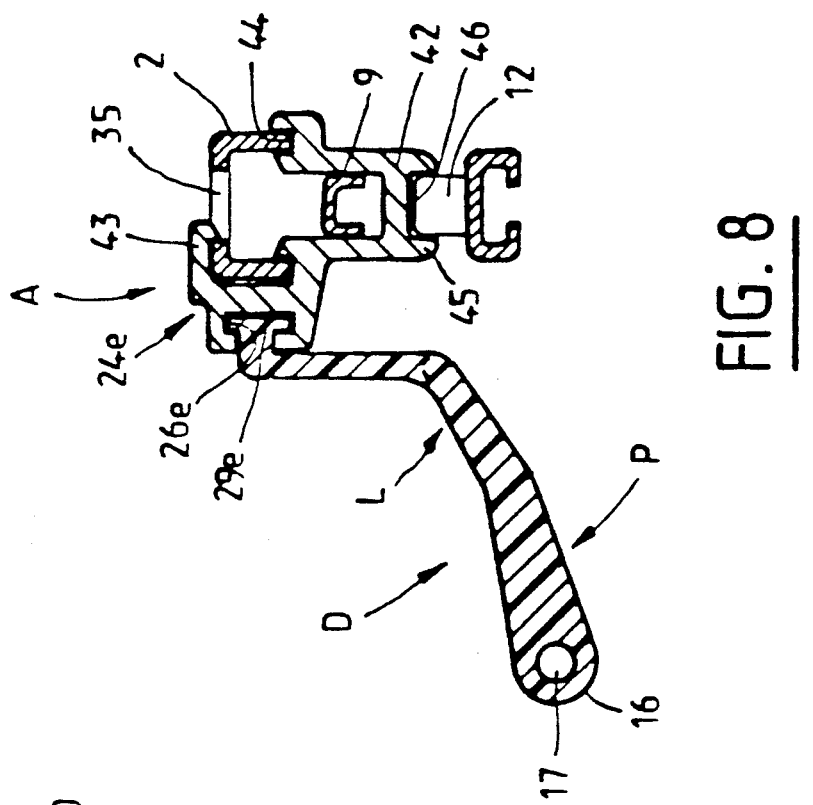
FIG. 8 is a transverse section, similar to FIGS. 5 and 6, of a further embodiment of deflector.

Referring to FIG. 1 of the drawings, there is shown a windscreen or windshield wiper 1 which comprises a supporting bar 2, constituted preferably by a shaped piece with an inverted U-shaped transverse section (see FIG. 2). This supporting bar 2 is intended to be carried by a windscreen wiper arm (not shown). Usually, in its median part the supporting bar 2 includes an opening 3 made in the base of the shaped piece through which the free end of the arm to passes. A transverse shaft 4 extends between the sides of the shaped piece at the level of the opening 3. This shaft 4 is adapted to be engaged in a housing at the end of the arm, to provide an articulated connection between the arm and the supporting bar 2.

The wiper 1 also comprises a blade 5, usually of elastomeric material, combined with a flexible metallic blade 6 provided on the side of blade 5 further away from the wiping edge thereof.

This blade 5 is carried by a system S of extension bars mounted on joints 7, 8 provided on the ends of the supporting bar 2. In the embodiment shown in FIG. 1, this system S of extension bars associated with each end of the supporting bar 2 comprises an intermediate extension bar 9 articulated on the corresponding end of the supporting bar 2. Each bar 9, the median direction of which in its resting position is substantially parallel to that of the supporting bar 2, supports the blade 5 by means of a claw 10 situated at the end of bar 9 further from the shaft 4.

The other end 11 of each extension bar 9, i.e. the end closer to the shaft 4, is situated between the supporting bar 2 and the blade 5 and carries, in an articulated manner, a second extension bar 12 the ends of which form claws supporting the blade 5.

Because the extension bars situated at the two ends of the supporting bar 2 are identical, they have been designated by the same reference numbers in the drawing.

The wiper 1 is equipped with an air deflector D provided with hooking means A for hooking onto the supporting bar 2.

The deflector D comprises a longitudinal member of shaped part P and comprises connecting means L between this shaped part P and the hooking means A, the connecting means L extending towards the surface 13 to be wiped, in particular the surface of a windscreen of an automotive vehicle.

The shaped part P has a substantially convex shape turned towards the surface 13 to be wiped. This shaped part P comprises on its inner surface 14 a substantially flat first zone 15 extending from a front edge 16 towards the rear, that is to say towards the blade 5.

The zone 15 is inclined at an angle b relative to the median plane of the surface 13 to be wiped. A substantially flat second zone 18 extends from the first zone 15 and terminates at a rear edge 19. The angle c of this second zone 18 relative to the median plane of the surface 13 to be wiped is greater than that angle b of the first zone 15, so that the shape of the inner surface of the part P is that of a convex dihedron turned towards the surface 13.

The second zone 18 is shorter than the first zone 15. In other words, the distance e between the ridge of the dihedron and the rear edge 19, which corresponds to the length of the zone 18, is less than the distance f between this same ridge of the dihedron and the front edge 16.

In a non-limiting embodiment, the front edge 16 has a radius of 2.5 mm. The distance f is 15 mm while the distance e is equal to 5 mm. The angle b is about 8° while the angle c is about 25°. The angle b of the first zone may be between 4° and 20°.

As can be seen in the drawings, such an arrangement enables a deflector to be provided having a shaped part which has a large portion close to the glass surface.

The connecting means L are then fitted, particularly with regard to their length, in such a way that the shaped part P is a distance h from the glass surface, which distance is sufficiently small to create a surface effect producing a relatively large decrease in pressure below the deflector D, that is to say in the region between the surface 13 and the shaped part P.

Preferably the distance h between the zone of the inner surface 14 of the deflector closest to the glass surface and this surface is less than the height H of the blade 5. Advantageously the distance h is less than or equal to 15 mm.

The outer surface 20 of the shaped part P has the shape of a concave dihedron, the thickness of the part P decreasing progressively from the front edge 16 towards the rear edge 19.

The edge 16 has a semi-cylindrical rounded shape. Edge 16 advantageously has therethrough a longitudinal internal channel 17 opening, at intervals therealong, towards the surface 13 to be wiped by means of nozzles, not shown in the drawing, to spray the surface 13. The channel 17 is adapted to be connected to a flexible pipe (not shown) supplying a liquid for washing the glass surface 13.

In accordance with the embodiment in FIGS. 1 and 2 the hooking means A, the connecting means L, and the shaped part P of the deflector form a single piece made by molding. The connecting means L are formed by two connecting legs 21, 22 in the illustrated example, such legs being separated from one another by a free space 23.

The hooking means A comprise, at the end of each connecting leg 21, 22 furthest from the shaped part P, a clip 24 (FIG. 2) having a section substantially in the shape of an inverted U made in such a way as to cap the supporting bar 2 and to hook onto it by means of inwardly extending projections 25 located at the edges of the sides of the supporting bar 2.

The deflector D is advantageously made of plastic material, and the arms of the clips 24 have a certain elasticity enabling them to clip onto the supporting bar 2.

FIG. 3 shows an alternative embodiment in which elements identical to the elements described in relation to FIGS. 1 and 2 are designated by the same reference numbers, sometimes followed by the letter a, without being described again. In accordance with this alternative embodiment, the clips 24a have a transverse section substantially in the shape of an inverted U but also include an integral housing with a recess 26 situated on the outside relative to the supporting bar 2 of the wiper. This housing as shown in FIG. 3, has a U-shaped internal section such that recess 26 is open towards the bottom, the cross-section of the opening to this housing being decreased by two hook forming projections 27.

The shaped part P and the connecting means L form a single piece 28 separate from the hooking means A. At its end furthest from the shaped part P each connecting means L includes an element 29 forming an enlargement with a section complementary to that of the housing 26. This element 29 is adapted to be engaged and fixed, by clipping, in the housing 26 to provide an assembly of the hooking means A and the connecting means L.

The clip 24a may cover a small zone of the supporting bar 2 or consist of a shaped piece extending over greater length thereof. The housing 26 may be constituted by a groove.

The single piece 28 formed by the shaped part P and the connecting means L may be obtained by extrusion, in which case the connecting means L extend along the entire length of the deflector. If it is desired that the connecting means L should be formed by connecting legs such as 21, 22 (FIG. 1), it is sufficient to perform a removal cutting operation on the extruded part.

Referring to FIGS. 4 and 5, an alternative embodiment of the deflector D can be seen and wherein the same reference numbers have been used as in FIGS. 1 and 2, sometimes followed by the letter b, to designate similar components, which are not described again.

In accordance with this embodiment, the hooking means A of the deflector comprise a third median lug 30 adapted to become hooked on a prolongation 31 of the shaft 4b articulating the supporting bar 2 on the windscreen wiper arm. The prolongation 31 comprises a cylindrical portion 32 having a diameter greater than that of the hole provided in the side of the supporting bar 2. This portion 32 comes into external abutment against the side of arm 2. Towards the outside, a portion having a smaller diameter follows on from the portion 32 in such way as to form an annular goove 33 into which can clip or extend an annular edge of the lug 30.

FIG. 6 shows an alternative embodiment in which the hooking-on clips such as 24c are intended to cooperate with a supporting bar 2 which has in its base openings such as 35. Each clip 24c, as can be seen in FIG. 6, substantially has the shape of a hook which engages in an opening 35 and the nose of which abuts beneath an edge of arm 2 defining such opening. The clip 24c is thus hooked onto only one side of the supporting bar 2.

Figure 7:
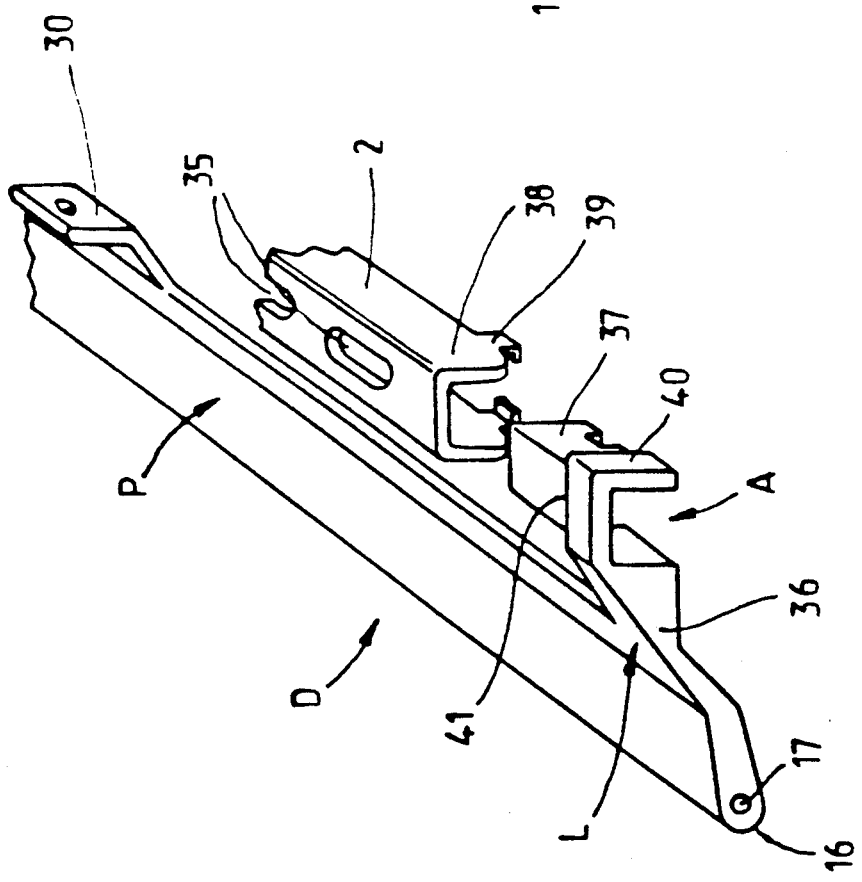
FIG. 7 is a perspective view of a longitudinal end of a supporting bar of a windscreen wiper and of the associated longitudinal end of another embodiment of deflector.

FIG. 7 shows an alternative embodiment in which the deflector D, partially shown, comprises at each of its longitudinal ends a transverse lug 36 (forming part of the connecting means L) which is equipped at its end furthest away from the shaped part P with a member 37 substantially parallel to the median longitudinal direction of the deflector D. This member 37 forms a joining piece suitable to be engaged in an associated end 38 of the supporting bar 2 at a region 39 of end 38 that can be articulated to an extension bar 9 (not shown in FIG. 7). Joining piece 37 becomes interposed between the supporting bar 2 and the extension bar to act as a noise suppressor.

The joining piece 37 has a transverse cross-section the outer contour of which is suitable to fit the inner contour of the end 38. In the present case, the supporting bar 2 having a transverse cross-section in the shape of an inverted U, the joining piece 37 likewise has a transverse cross-section in the shape of an inverted U open towards the bottom. The portion 40 of the lug 36 which is connected to the joining piece 37 likewise has a transverse cross-section in shape of an inverted U, having a thickness greater than that of the joining piece, so that an outer shoulder 41 is formed at the junction of the portion 40 and the joining piece 37. This shoulder may act as a stop against which abuts the end of the supporting bar 2.

It is obvious that the end of the deflector D not shown in FIG. 7 is equipped with a joining piece similar to 37 but pointing in the opposite direction. The joining pieces may be engaged in the ends 38 of the supporting bar 2 by elastic deformation of the deflector and possibly of the supporting bar.

FIG. 8 shows an alternative embodiment of the clip in FIG. 3 to hook the deflector to the supporting bar 2. As in the previous Figures, the components similar to the components already described are designated by the same reference numbers, sometimes followed by the letter e in the case of FIG. 8, without the description of these components being repeated. The clip 24e in FIG. 8 is made so as to have a portion 42 suitable to be engaged between the extension bars 9 and 12 to act as a guiding element for such bars.

The clip 24e comprises an upper portion 43 in the form of a nose, suitable to be engaged in an opening 35 in the base of the supporting bar 2, the clip 24e being hooked substantially on a single side of the supporting bar 2 (the left side as shown in FIG. 8).

The clip 24e comprises a housing defining a recess 26e situated on the outside relative to the supporting bar 2 and opening laterally. The recess 26e has a T-shaped cross-section the middle leg of which is disposed horizontally, as shown in FIG. 8, on the side opposite to the supporting bar 2. The hooking element 29e provided at the end of the connecting means L has a shape corresponding to that of the recess 26e.

The portion 42 of the clip 24e, adapted to provide guidance for the extension bars, has a substantially U-shaped transverse cross-section the concavity of which is directed in a direction opposite to that of the supporting bar 2. The upper edges of the sides of the portion 42 each comprise a groove 44 suitable to receive the lower edge of the associated side of the supporting bar 2. The extension bar 9 is engaged in the concavity of the portion 42, the distance between the inner faces of the sides of portion 42 being equal to the width of the extension bar 9 in order to provide good guidance.

The sides of the portion 42 are prolonged downwardly beyond the transverse base of portion 42 so as to form a shoulder 45 on each side. A recess 46 open at the bottom is thus defined by the outer surface of the base of the portion 42 and the lateral shoulders 45. This recess 46 receives a portion of the extension bar 12 and provides guidance therefor.

When the surface to be wiped is curved, the deflector is provided with a plurality of sections connected to different extension bars, which enables more precise following of the curved surface.

Whatever the embodiment adopted, the deflector D enables a surface effect to be obtained an a relatively large reduction of pressure to be created in the zone between the deflector and the windscreen, thereby enabling the blade to be applied correctly against the glass surface.

The surface effect may be completed by a skirt effect by providing a flexible cover mounted on the wiper at each end zone of the deflector, which permits the reduced pressure to be maintained. This cover surrounding the end of the wiper on each side in the no-effect zone of the deflector will have the shape of an inverted U closed at that end which is next to the end of the wiper, and attached by any appropriate means to the extension bar 9 or to the end of the wiper.

The deflector may be made of plastics material, particularly polypropylene or polyamide. The hooking means A, when they consist of clips independent of the connecting means L (embodiments of FIGS. 3 and 8), may be made of plastics material or of metal.

The efficiency of the deflector enables it to be of a relatively short length g (FIG. 1), for example between $\frac{1}{4}$ and $\frac{3}{8}$ of the length of the blade 5.

During the course of wiping an inclined windscreen, when the automotive vehicle is moving, wiping is facilitated during a rising movement because the air pressure pushes the windscreen wiper in the same direction as the drive motor, whereas during a descending movement wiping is braked by the air pressure which opposes downward movement. This may result in a difference between the speed of upward movement and the speed of descent of the windscreen wiper.

In the case of a windscreen wiper equipped with a deflector in accordance with the invention it has been surprisingly established that the speed of descent of the windscreen wiper when the vehicle is moving remains substantially equal to the speed of upward movement.

In order to avoid the front edge of the deflector from coming into contact with the surface to be wiped during changes in direction, in an alternative it is proposed to fix rubber components to the lower surface of the front edge. These components could, for example, be formed from elements of the lip of the blade. Such rubber components would have dimensions such that they do not come into contact with the surface to be wiped during the wiping cycle.

What is claimed:

1. A deflector apparatus for use on a windshield wiper having a blade and carried by a wiper arm, said apparatus comprising:
    a longitudinal deflector member having a convex deflector surface to be directed toward a windshield surface to be wiped;
    hooking means, connected to said deflector member, for mounting said deflector member on one of the wiper or the wiper arm in a position such that said deflector surface is spaced from the windshield surface to be wiped;
    said deflector member having a first edge spaced from said hooking means and a second edge adjacent said hooking means;
    said deflector surface having the shape of a convex dihedron and including a substantially flat first portion extending from said first edge toward said second edge and a substantially flat second portion intersecting said first portion and extending therefrom to said second edge, said first and second surface portions being continuous surfaces along the entire length of said deflector; and
    said first surface portion being inclined at a first angle relative to the median plane of the windshield surface to be wiped, when said deflector member is mounted in said position, and said second surface portion being inclined at a second angle, relative to such median plane when said deflector member is in said position, said second angle being greater than said first angle.

2. An apparatus as claimed in claim 1, wherein said first angle is between 4° and 20°.

3. An apparatus as claimed in claim 2, wherein said first angle is substantially 8°.

4. An apparatus as claimed in claim 1, wherein said second angle is approximately 25°.

5. An apparatus as claimed in claim 4, wherein said first surface portion has a dimension, in a direction parallel to the median plane, greater than the dimension in said direction of said second surface portion.

6. An apparatus as claimed in claim 4, further comprising connecting means connecting said hooking means to said deflector member.

7. An apparatus as claimed in claim 6, wherein said connecting means has a structure to ensure that the area of said deflector member closest to the surface to be wiped is spaced therefrom by a distance smaller than the height of the wiper blade.

8. An apparatus as claimed in claim 7, wherein said distance is equal to or less than 15 mm.

9. An apparatus as claimed in claim 7, wherein said hooking means, said connecting means and said deflector member are of integral and one-piece construction.

10. An apparatus as claimed in claim 9, wherein said integral and one-piece construction comprises a molded element.

11. An apparatus as claimed in claim 7, wherein said connecting means comprises plural legs spaced from each other.

12. An apparatus as claimed in claim 7, wherein said hooking means comprise clips to be clipped onto a supporting bar of the windshield wiper.

13. An apparatus as claimed in claim 1, wherein said hooking means comprise clips, separate from said deflector member, to be clipped onto a supporting bar of the windshield wiper.

14. An apparatus as claimed in claim 13, further comprising connecting means for connecting said deflector member to said clips.

15. An apparatus as claimed in claim 14, wherein said connecting means and said deflector member are of integral and one-piece construction.

16. An apparatus as claimed in claim 14, wherein each said clip has therein a recess, and said connecting means comprises legs extending from said deflector member, each said leg having at a free end thereof a portion to be received and retained in said recess of a respective said clip.

17. An apparatus as claimed in claim 1, wherein said hooking means include, at each of opposite ends of said apparatus, a joining member to be fitted into a respective end of a supporting bar of the windshield wiper.

18. An apparatus as claimed in claim 1, wherein the thickness of said deflector member decreases from said first edge to said second edge.

19. An apparatus as claimed in claim 18, wherein said thickness decreases progressively.

20. An apparatus as claimed in claim 1, wherein said deflector member further has a surface to be directed away from the windshield surface to be wiped and having the shape of a concave dihedron.

* * * * *